United States Patent [19]

Sudo

[11] 4,017,229
[45] Apr. 12, 1977

[54] APPARATUS FOR UNITING CONCENTRICALLY EXTRUDED TUBULAR FILMS OF THERMOPLASTIC SYNTHETIC RESIN

[76] Inventor: Michio Sudo, c/o Nikko Resin Co. Ltd., Fujikoshi Bldg. No. 23-7, 5 chome, Higashi Gotanda, Shinagawa, Tokyo, Japan

[22] Filed: May 27, 1976

[21] Appl. No.: 690,571

Related U.S. Application Data

[63] Continuation-in-part of Ser. No. 558,716, March 14, 1975, abandoned, which is a continuation-in-part of Ser. No. 330,043, Feb. 6, 1973, Pat. No. 3,894,907.

[30] Foreign Application Priority Data

June 26, 1972  Japan .............................. 47-63273

[52] U.S. Cl. .................... 425/71; 425/505; 425/506; 425/143; 425/174.8 R; 425/324 R; 425/404; 156/494
[51] Int. Cl.² .................. B29C 17/07; B29C 27/12
[58] Field of Search ............ 425/71, 500, 505, 506, 425/174.8 E, 174.8 R, 143, 324 R, 393, 404, 445; 264/26, 262, 289, 95; 156/244, 229, 494, 498, 499

[56] References Cited

UNITED STATES PATENTS

| | | |
|---|---|---|
| 3,275,725 | 9/1966 | Utz .................................. 156/244 X |
| 3,608,019 | 9/1971 | Sato et al. ............................ 264/95 |
| 3,677,676 | 7/1972 | Hegler .......................... 425/505 X |
| 3,726,743 | 4/1973 | Reifenhauser et al. ............ 156/494 |
| 3,754,063 | 8/1973 | Schirmer ...................... 156/244 X |
| 3,770,931 | 11/1973 | Gillistt ....................... 425/174.8 R |

*Primary Examiner* — Robert L. Spicer, Jr.
*Attorney, Agent, or Firm* — Michael J. Striker

[57] ABSTRACT

Apparatus for uniting at least two concentrically extruded tubular films of thermoplastic synthetic resin includes a mandrel located in the innermost of the films and having a leading conical portion and a trailing cylindrical portion to expand the innermost film in transverse direction substantially to the diameter of the outermost film. The mandrel is heated by electromagnetic waves produced by a high-frequency transmitter connected to a high-frequency coil surrounding the tubular films in the region of the mandrel. A temperature sensor connected to the mandrel senses the temperature of the latter and the sensed temperature is transmitted by an ultra shortwave transmitter connected to the sensor and ultra shortwave receiver connected to the high-frequency transmitter to control the latter and to maintain the temperature of the mandrel at a desired constant temperature.

7 Claims, 2 Drawing Figures

4,017,229

APPARATUS FOR UNITING CONCENTRICALLY EXTRUDED TUBULAR FILMS OF THERMOPLASTIC SYNTHETIC RESIN

CROSS-REFERENCE TO RELATED APPLICATIONS

The present application is a continuation-in-part application of the copending application Ser. No. 558,716, filed Mar. 14, 1975 now abandoned, with the title "Apparatus for Uniting Concentrically Extruded Tubular Films of Thermoplastic Synthetic Resin", which in turn is a continuation-in-part application of the application Ser. No. 330,043 filed Feb. 6, 1973 now U.S. Pat. No. 3,894,907, with the title "Method and Apparatus for Manufacturing a Flattened Cylindrical Film Consisting of Layers of Thermoplastic Resins Stretched Crosswisely."

BACKGROUND OF THE INVENTION

The present invention relates to an apparatus for uniting at least two concentrically extruded tubular films of thermoplastic synthetic resin wherein at least one of the films is heated to a temperature slightly below the melting point of the resin from which it is formed.

In order to obtain an end product of high tear strength, the extruded tubular films are stretched in such an apparatus in different directions. The outermost tubular film is stretched longitudinally without changing its diameter and each of the inner extruded tubular films, which have a smaller diameter than the outermost film, are stretched in a direction transverse to their longitudinal direction by a heated mandrel located within the innermost film and having a maximum diameter substantially equal to the diameter of the outermost film.

SUMMARY OF THE INVENTION

It is an object of the present invention to provide an apparatus for uniting at least two concentrically extruded tubular films of thermoplastic synthetic resin by heating at least one of the films to a temperature slightly below its melting point, while simultaneously stretching the inner film in a direction transverse to their longitudinal direction to a diameter substantially equal to the diameter of the outermost film.

It is a further object of the present invention to provide an apparatus of the above-mentioned type in which the stretching of the inner films in transverse direction and heating of at least one of the films is carried out by a heated mandrel located within the innermost film.

It is an additional object of the present invention to heat the mandrel located in the innermost film by means of a high-frequency transmitter connected to high-frequency coil located outside of the films in the region of the mandrel.

It is also an object of the present invention to provide means for maintaining the heated mandrel at a desired predetermined temperature.

With these and other objects in view, which will become apparent as the description proceeds, the apparatus according to the present invention for uniting at least two concentrically extruded tubular films of thermoplastic resin to each other mainly comprises mandrel means located within the innermost of the concentrically extruded films and constructed to expand the latter in a direction transverse to its longitudinal direction so that the peripheral surfaces of the concentrically extruded films will engage each other. The apparatus includes further heating means for heating the mandrel means and comprising a high-frequency coil surrounding the outermost of the concentrically extruded films in the region of said mandrel means and a high-frequency transmitter connected to this coil.

The apparatus preferably includes further control means connected to the high-frequency transmitter for switching the latter on and off to thereby maintain the temperature of the mandrel means at a predetermined temperature.

Such control means preferably comprise temperature sensing means within the mandrel means, an ultra shortwave transmitter connected to the temperature sensing means, and an ultra shortwave receiver connected to the high-frequency transmitter.

The mandrel means has preferably a leading conical portion and a trailing cylindrical portion. The leading conical portion is preferably hollow and the heating means may include a container for a liquid downstream of the cylindrical portion of the mandrel means and passage means extending through the cylindrical portion and providing communication between the container and the hollow conical portion so that steam developing from the liquid by heating the same by the above-mentioned heating means can pass through the passage means into the hollow conical portion to heat the latter to the desired temperature which may be controlled by the temperature sensing means extending into the liquid in the container and by transmitting the sensed temperature by an ultra shortwave transmitter connected to the temperature sensing means to an ultra shortwave receiver connected to the high-frequency transmitter to switch the latter on and off in dependency on the sensed temperature to maintain the mandrel means at a desired predetermined temperature.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
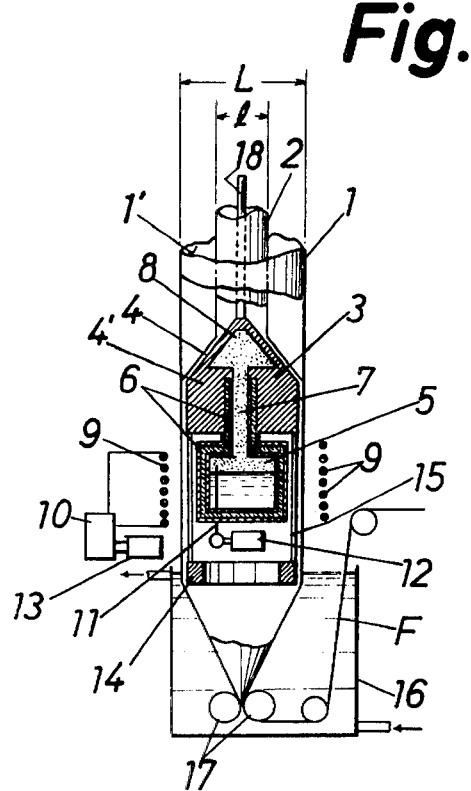
FIG. 1 is a schematic partly sectioned side view of the apparatus according to the present invention.

FIG. 1 schematically shows a plurality of tubular concentrically extruded films extruded from an apparatus well known in the art, not forming part of the present invention and not illustrated in the drawing. These tubular films of synthetic thermoplastic resin include an outermost film 1 having a diameter L and an innermost film 2 having a smaller diameter 1. Laminated to the inner surface of the outermost film 1 is a tubular film 1' which has a lower melting point than the films 1 and 2 and which, when heated, closely adjacent to its melting point has excellent adhesive qualities. Instead of laminating the film 1', to the inner surface of the outermost film 1, it is also possible to have such a film 1', with the characteristics mentioned above, between the films 1 and 2 and having a diameter between the diameters 1 and L.

The outermost tubular film 1 consists of a synthetic resin of polyolefin, such as a high density polyethylene or polypropylene, having a high tensile strength and a considerably higher melting point than the film 1', which preferably consists also of a thermoplastic synthetic resin, such as ethylenevinyl-acetate polymer or ethylene-ethyl acrylate polymer and which, as mentioned above, has a lower melting point than the tubular film 1. The inner tubular film 2 is preferably made of the same resin as the outermost film 1.

Located within the innermost film 2 is a metallic mandrel 3 having a leading conical portion 4 and a trailing cylindrical portion 4' of a diameter equal to the maximum diameter of the leading conical portion. The mandrel 3 is suspended within the innermost film 2 on a suspension rod 18 which is anchored at its upper end, not shown in the drawing, on a pair of upper squeeze rollers, likewise not shown in the drawing, in a manner as clearly described in the above-mentioned copending application Ser. No. 330,043 to which reference may be had with regard to the anchoring means of the suspension rod 18. Located below or downstream of the cylindrical portion 4' of the mandrel 3 is a container 5 adapted to contain a liquid, for instance water, and the interior of the container 5 communicates through a passage 7 extending through the cylindrical portion of the mandrel 3 with a cavity 8, preferably also of conical configuration, provided in the conical portion 4 of the mandrel. The container 5 and the passage 7 are preferably surrounded by heat insulating material 6. A high-frequency coil 9 surrounds the outermost film 1 in the region of the container 5. The high-frequency coil 9 is connected to a high-frequency transmitter 10 which, in turn, is connected to a source of electric energy, not shown in the drawing and arranged to transmit electromagnetic waves through the coil 9 to the mandrel so that by actuating the high-frequency transmitter the liquid in the container 5 may be heated. Sensing means 11 extend into the liquid in the container to sense the temperature of the latter, and the temperature sensing means 11 is connected to an ultra shortwave transmitter 12, which, in turn, cooperates in a known manner with an ultra shortwave receiver 13, connected to the high-frequency transmitter 10, to switch the latter on and off in dependency on the temperature sensed by the temperature sensing means 11 so as to keep the temperature of the mandrel 3 at a constant predetermined temperature. The mandrel 3 includes a further cylindrical portion 14 located below the container 5 and connected to the upper cylindrical mandrel portion 4' by a plurality of bars 15. A tank 16, into which a cooling fluid, such as cold water, is continuously fed and discharged therefrom, as indicated by the arrows at the lower inlet and upper outlet for such cooling fluid, is located downstream or below the mandrel 3 and a pair of squeeze rolls 17, driven by means not shown in the drawing, is located adjacent the bottom of the tank 16. The tubular films 1, 1' and 2 are passed between the nip of these rolls. The stretched and united tubular film F is cooled rapidly in the water of the tank 16 and fed out of the same by guide rolls shown in FIG. 1.

The above-described apparatus will operate as follows:

At the start of the operation the high-frequency transmitter 10 is actuated to thereby transmit high-frequency waves through the coils 9 connected thereto to the mandrel 3 and the container 5 connected thereto. The electromagnetic waves of high-frequency transmitted to the mandrel will create eddy currents therein and heat the mandrel without heating the tubular films and the heat insulating material around the container 5, to thereby heat the liquid in the container 5.

Due to the heating of the liquid the latter is vaporized and the steam passes through the passage 7 into the cavity 8 at the upper conical portion of the mandrel 3 to thereby keep the outer surface of the conical portion 4 at a temperature at which the tubular film 1', having a lower melting point than the films 1 and 2, is softened so that as the inner tubular film 2 passes over the cylindrical portion 4' of the mandrel, the three films are united with each other. As the inner tubular film 2 passes over the conical portion 4 of the mandrel onto the cylindrical portion 4' it is simultaneously stretched in a direction transverse to its elongation.

The temperature sensed by temperature sensing means 11 is transmitted by an ultra shortwave transmitter 12 connected thereto to the ultra shortwave receiver 13 connected to the high-frequency transmitter 10 to switch the latter on and off, depending on the temperature sensed to thereby assure that the mandrel portions 4 and 4' and especially the conical mandrel portion 4 is always automatically kept at the necessary desired temperature.

Figure 2:
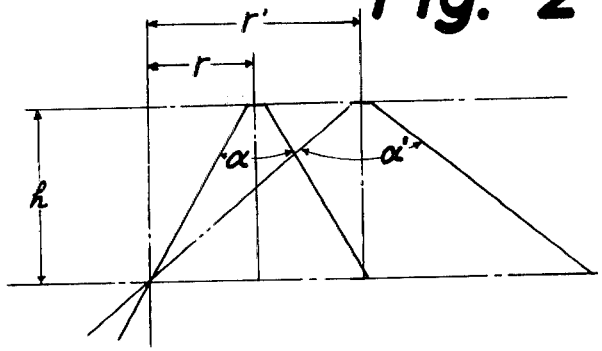
FIG. 2 is a graph showing the relation of lateral stretch of the films to the basic shape of the conical leading portion of the mandrel.

The cone angle $\alpha$ of the conical portion 4 of the mandrel may be changed within the wide limits. However, as shown in FIG. 2, for a given height $h$ of the conical portion of the mandrel the final radius of the stretched inner tubular film will be either $r$ or $r'$, dependent on the cone angle. The maximum cone angle has therefore to be chosen in such a manner so as not to exceed the stretchability of the inner tubular film in slightly softened condition since otherwise the apparatus would not be operable properly.

As mentioned in the copending application Ser. No. 330,043 the outer tubular film 1 is stretched in longitudinal direction due to the fact that the squeeze roller 17 at the bottom of the tank 16 are rotated at a higher angular speed than upper squeeze roller, not shown in FIG. 1, whereas the inner tubular film 2 is stretched in a direction transverse to its elongation so that the united film F emanating from the tank 16 will have a very high tear resistance. The united film F is cooled rapidly by the cold liquid in the tank 16 so that crystallization of the material of the film is prevented. As a result, a tubular film F having a high transparency can be produced.

With the apparatus according to the present invention the mandrel 3 located within the films is heated and maintained at a predetermined necessary temperature by the above-described arrangement without the necessity of a direct connection of the heating means within the mandrel with an outside source of energy, but heating of the mandrel in the construction of the present invention is produced by the high-frequency transmitter 10, the operation of which is controlled by the temperature sensing means 11 and the ultra shortwave transmitter 12 connected thereto as well as the ultra shortwave receiver 13 connected to the high-frequency transmitter.

It will be understood that each of the elements described above, or two or more together, may also find a useful application in other types of apparatus for uniting at least two concentrically extruded tubular films of thermoplastic synthetic resins differing from the types described above.

While the invention has been illustrated and described as embodied in an apparatus for the aforementioned kind in which the inner film is stretched over a mandrel to the diameter of the outermost film and in which the mandrel is heated by electromagnetic waves produced by a high-frequency transmitter, the operation of which is controlled without a direct connection between the high-frequency transmitter and the mandrel, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In an apparatus for uniting at least two concentrically extruded tubular films of thermoplastic synthetic resins to each other, a combination comprising mandrel means located within the innermost of the concentrically extruded films and constructed to expand said innermost film in a direction transverse to its elongation so that the surfaces of the concentrically extruded films will engage each other; heating means for heating said mandrel means, said heating means comprising a high-frequency coil surrounding the outermost of said concentrically extruded films in the region of the mandrel means and a high-frequency transmitter connected to said coil for causing the engaging surfaces of the at least two concentrically extruded films to unite.

2. A combination as defined in claim 1, and including control means connected to said high-frequency transmitter for switching the latter on and off to thereby maintain the temperature of said mandrel means at a predetermined temperature.

3. A combination as defined in claim 2, wherein said control means comprise temperature sensing means within said mandrel means, an ultra-shortwave transmitter connected to said temperature sensing means and an ultra shortwave receiver connected to said high-frequency transmitter.

4. A combination as defined in claim 1, wherein said mandrel means has a leading conical portion and a trailing cylindrical portion.

5. A combination as defined in claim 3, wherein said mandrel means comprises a leading hollow conical portion and a trailing cylindrical portion, and including a container for a liquid downstream of said cylindrical portion and passage means extending through said cylindrical portion and providing communication between said container and said hollow conical portion so that steam developing from said liquid by heating the same will pass through said passage means into the hollow conical portion to heat the latter, said temperature sensing means extending into the liquid in said container.

6. A combination as defined in claim 5, and including insulating material surrounding said container and at least part of said passage means.

7. A combination as defined in claim 1, and including a tank downstream of said mandrel means, means for continuously feeding a cooling liquid into said tank and for discharging cooling liquid therefrom, a pair of driven squeeze rollers in said tank through the nip of which said tubular films are passed, and guide rolls downstream of said squeeze rolls for guiding the film out of said tank.

* * * * *